(12) United States Patent
Breedvelt-Schouten

(10) Patent No.: US 11,475,253 B2
(45) Date of Patent: Oct. 18, 2022

(54) DATA GRAPH FOCUS MODE

(71) Applicant: International Business Machines Corporation, Armonk, NY (US)

(72) Inventor: Ilse M. Breedvelt-Schouten, Manotick (CA)

(73) Assignee: International Business Machines Corporation, Armonk, NY (US)

(*) Notice: Subject to any disclaimer, the term of this patent is extended or adjusted under 35 U.S.C. 154(b) by 468 days.

(21) Appl. No.: 16/685,756

(22) Filed: Nov. 15, 2019

(65) Prior Publication Data

US 2021/0150285 A1 May 20, 2021

(51) Int. Cl.
*G06F 16/904* (2019.01)
*G06K 9/62* (2022.01)
*G06N 20/00* (2019.01)
*G06F 16/906* (2019.01)
*G06F 16/901* (2019.01)

(52) U.S. Cl.
CPC ......... *G06K 9/6276* (2013.01); *G06F 16/904* (2019.01); *G06F 16/906* (2019.01); *G06F 16/9024* (2019.01); *G06K 9/6224* (2013.01); *G06N 20/00* (2019.01)

(58) Field of Classification Search
CPC ... G06F 16/906; G06F 16/904; G06F 16/9024
See application file for complete search history.

(56) References Cited

U.S. PATENT DOCUMENTS

| 7,734,619 B2 | 6/2010 | Vierich |
| 9,910,901 B2 | 3/2018 | Brainerd |
| 10,261,661 B2 | 4/2019 | Ramanathan |
| 2006/0271505 A1 | 11/2006 | Vierich |

(Continued)

FOREIGN PATENT DOCUMENTS

CN 101359271 B 9/2016

OTHER PUBLICATIONS

"Force-directed graph drawing," Wikipedia, printed Nov. 15, 2019, 8 pages. <https://en.m.wikipedia.org/wiki/Force-directed_graph_drawing>.

(Continued)

*Primary Examiner* — Baoquoc N To
(74) *Attorney, Agent, or Firm* — Brian D. Welle

(57) ABSTRACT

A request is received to temporarily identify nodes that are related to one or more selected nodes of a plurality of nodes for a data graph data structure that includes a plurality of relationships between a plurality of nodes arranged in a predetermined spatial arrangement. One or more related nodes that are related to the one or more selected nodes are identified. A display generates only the one or more selected nodes and each of the one or more related nodes and the relationships thereof in an updated spatial arrangement that defines relatively less cumulative space between the one or more selected nodes and the one or more related nodes than the predetermined spatial arrangement. A request to stop generating the updated spatial arrangement is received. The display stops generating the predetermined spatial arrangement in response to receiving the request to stop generating the updated spatial arrangement.

18 Claims, 6 Drawing Sheets

(56) References Cited

U.S. PATENT DOCUMENTS

2009/0037848 A1    2/2009  Tewari
2013/0135313 A1*  5/2013  Gleadall ................. G06T 11/20
                                                          345/440

OTHER PUBLICATIONS

"Network Navigator Chart," Microsoft Corporation, Apr. 17, 2018, 2 pages, <https://appsource.microsoft.com/en-us/product/power-bi-visuals/WA104380795?tab=Overvie>.

Anonymous, "Context-Based Layer Visibility for Nested Multigraphs," IP.com, Disclosure No. IPCOM000214424D, Jan. 26, 2012, 5 pages. <https://priorart.ip.com/voucher-purchase/IPCOM000214424D>.

Anonymous, "Method of Visualizing Semantic Deltas in Diagrams using Affinity," IP.com, Disclosure No. IPCOM000199645D, Sep. 13, 2010, 10 pages. <https://priorart.ip.com/voucher-purchase/IPCOM000199645D>.

* cited by examiner

DATA GRAPH FOCUS MODE

BACKGROUND

Computer data structures are getting increasingly robust as users discover more nuanced ways to view and analyze data. One common data structure when viewing data stored on computers is a data graph, where different data tables are represented by "nodes" and are connected to one or more other nodes to represent their relationships with the respective other data tables. Depending on the system that is being represented, there may be dozens or hundreds of nodes within the structure, with many nodes being connected to a plurality of other nodes.

SUMMARY

Aspects of the present disclosure relate to a method, system, and computer program product relating to identifying and displaying node relationships of a data graph structure. For example, a method includes receiving a request to temporarily identify nodes that are related to one or more selected nodes of a plurality of nodes for a data graph data structure. The data graph data structure includes a plurality of relationships between a plurality of nodes arranged in a predetermined spatial arrangement. The method includes identifying one or more related nodes that are related to the one or more selected nodes. The method includes causing a display to generate only the one or more selected nodes and each of the one or more related nodes and the relationships thereof in an updated spatial arrangement. The updated spatial arrangement defines relatively less cumulative space between the one or more selected nodes and the one or more related nodes than the predetermined spatial arrangement. The method includes receiving a request to stop generating the updated spatial arrangement. The method includes causing the display to generate the predetermined spatial arrangement in response to receiving the request to stop generating the updated spatial arrangement. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1A:
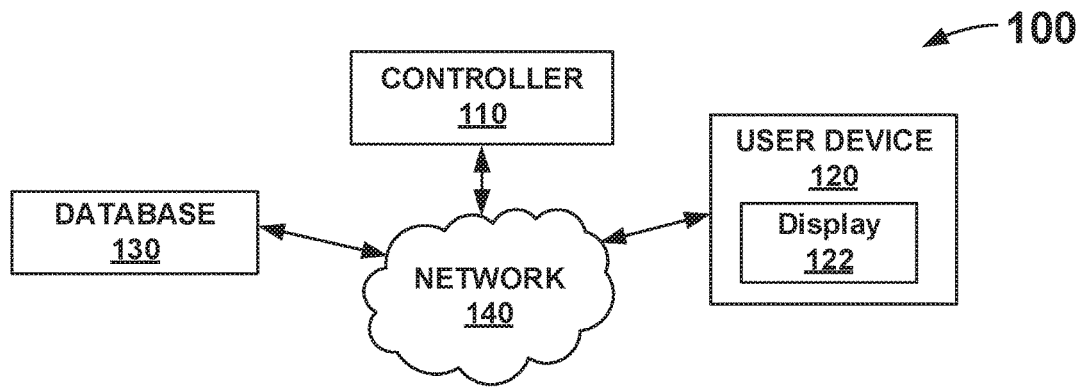
FIG. 1A depicts a conceptual diagram of an example system in which a controller may cause a display to generate a focus mode of a data graph data structure consistent with embodiments of this disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to providing a focus mode for data structures, while more particular aspects of the present disclosure relate to identifying a focus mode that includes a subset of nodes of a data graph data structure in a condensed spatial arrangement and autonomously transitioning from that focus mode into a predetermined spatial arrangement of the data graph data structure with all of the nodes of the data graph data structure. While the present disclosure is not necessarily limited to such applications, various aspects of the disclosure may be appreciated through a discussion of various examples using this context.

Different data structures may have different advantages and disadvantages. For example, one data structure that is relatively good at displaying relationships between different data concepts is a data graph data structure (hereinafter interchangeably referred to as a data graph and a data graph data structure), where different data concepts are stored as tables and then represented as "nodes" of the data graph. Further, the data graph may include relationships between these nodes as indicated by lines or edges that connect these nodes.

A data graph may have any number of nodes, and each node may have any number of relationships to other nodes. The data graph may have a predetermined spatial arrangement that is configured to aid the visual analysis of the data graph (e.g., by arranging related nodes close to each other, or by arranging types of nodes in a certain area, or the like). Further, some nodes of this data graph may be connected to a single node, while some of which are connected to a handful of nodes, and some of which may be connected to a few dozen nodes.

One potential disadvantage of a given data graph is that, as the data graph grows, it may be relatively difficult for a user to identify and/or analyze the nodes and/or relationships of a handful of selected nodes. For example, a data graph may have a few hundred nodes that are related together in different ways. When a user viewing the data graph modifies the magnification level by decreasing the magnification of the display (e.g., the user "zooms out") to view the full data graph to see nodes on different sides of the data graph, the user may have difficult time comprehending or understanding all of the nodes given the number of nodes and/or intersecting relationships. If a user modifies the magnification level by increasing the magnification level (e.g., the user "zooms in") to try to parse out these relationships, the user may lose sight of the individual nodes. In this example, if a user wants to identify/analyze the nodes that are related to a selected node, and/or are wants to identify a "second tier" of secondarily related nodes (e.g., nodes that are related to the nodes that directly relate to a selected node) it may be difficult or cumbersome to track all of the relationships across all of the data graph to see all of the relevant nodes at once.

Some conventional systems attempt to solve this problem by highlighting each of the nodes that are related to the selected node(s). While this may help a user at least identify all of the individual nodes of a data graph, if the nodes are spatially spread across a few hundred nodes, it may be difficult to fully grasp the meaning of all of the relationships, and/or to visually read the different labels for the different nodes. Other conventional systems may utilize a conventional "focus mode," in which all nodes that are not related to the selected node are hidden. In some examples, this conventional focus mode may further enable a user to cause the visible nodes to "auto arrange" to fit closer together on the data graph. In this way, a user could identify relevant relationships. However, in these conventional systems, when a user exits the conventional focus mode, the conventional computing system would simply unhide each of the previously hidden nodes, such that the auto-arranged nodes would overlap with these previously hidden nodes, and/or otherwise be suboptimally located relative to these previously hidden nodes.

Aspects of the disclosure relate to improving or eliminating these disadvantages by providing a focus mode in which only the related nodes are depicted in a graphical user interface (GUI), after which the system transitions back to display the full data graph in the predetermined spatial arrangement. A computing system that includes a processor that executes instructions stored on a memory (this computing system hereinafter referred to as a controller) may perform these operations. The controller may be configured to identify a focus mode related to a single node or a plurality of nodes. Further, the controller may be configured to identify only those related nodes that are directly connected to the selected node(s), and/or the controller may be configured to identify both directly related nodes and secondary related nodes (e.g., nodes that are related to the directly related nodes), and so on. In some examples, controller 110 may be configured to animate a transition between focus mode and the predetermined spatial arrangement of the full data graph.

For example, FIG. 1A depicts system 100 that includes controller 110 that is configured to provide and manage a focus mode as discussed herein. Controller 110 may include a computing device, such as computing device 200 of FIG. 5 that includes a processor communicatively coupled to a memory that includes instructions that, when executed by the processor, causes controller 110 to execute one or more operations described below. Controller 110 may manage a focus mode for a data graph as created, viewed, and/or managed by one or more user devices 120. User devices 120 may include computing devices (e.g., devices similar to computing device 200 of FIG. 5) such as laptops, desktops, mobile phones, tablets, or the like. User devices 120 may include display 122 on which controller 110 may cause the graphical presentation of a data graphs (and/or a focus mode thereof).

Figure 5:
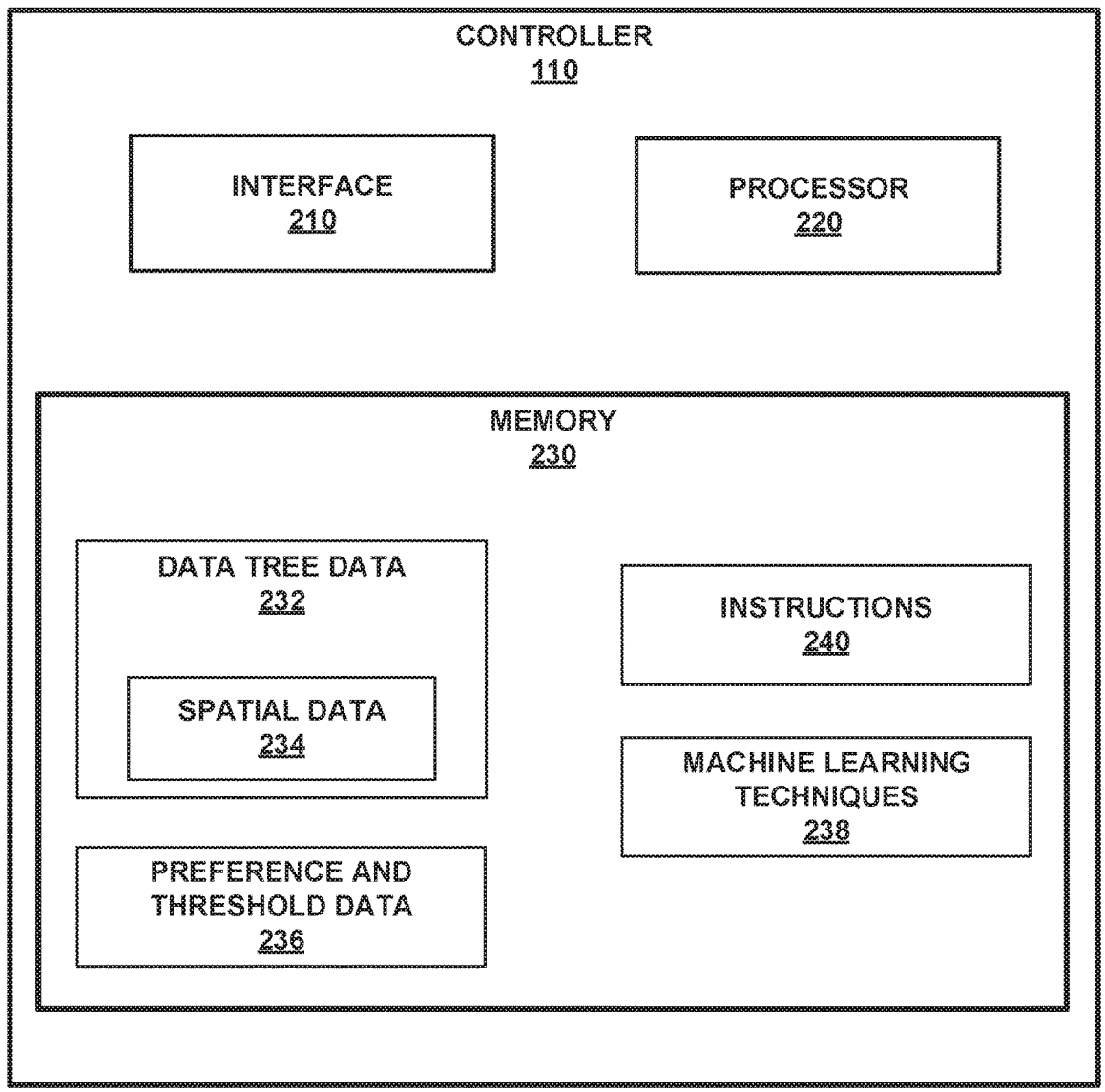
FIG. 5 depicts a conceptual box diagram of example components of the controller of FIG. 1A.

Controller 110 may store and/or access data on these data graphs on database 130, which may be a computing device (similar to computing device 200 of FIG. 5) such as a server or rack of servers or the like. In some examples, as depicted in FIG. 5, some of database 130 may be integrated into controller 110. In other examples, each of controller 110 and database 130 may be integrated into user device 120, for example where user device 120 stores all data of database 130 and controller 110 is saved as a software application on user device 120. However, for purposes of clarity, each of controller 110, user device 120, and database 130 are depicted as separate components in FIG. 1A.

Controller 110, user device 120, and database 130 may communicate together over network 140. Network 140 may include a computing network over which computing messages may be sent and/or received. For example, network 140 may include the Internet, a local area network (LAN), a wide area network (WAN), a wireless network such as a wireless LAN (WLAN), or the like. Network 140 may comprise copper transmission cables, optical transmission fibers, wireless transmission, routers, firewalls, switches, gateway computers and/or edge servers. A network adapter card or network interface in each computing/processing device (e.g., controller 110, user devices 120, and database 130) may receive messages and/or instructions from and/or through network 140 and forward the messages and/or instructions for storage or execution or the like to a respective memory or processor of the respective computing/processing device.

Though network 140 is depicted as a single entity in FIG. 1A for purposes of illustration, in other examples network 140 may include a plurality of private and/or public networks. For example, controller 110 and database 130 may communicate together over a private LAN of network 140. For another example, controller 110 may manage data graphs as manipulated on user device 120 by coupling to a private WLAN of network 140 on which user device 120 is connected. In some examples, user device 120 may utilize functionality of controller 110 as a software-as-a-service using the Internet of network 140.

Figure 1B:
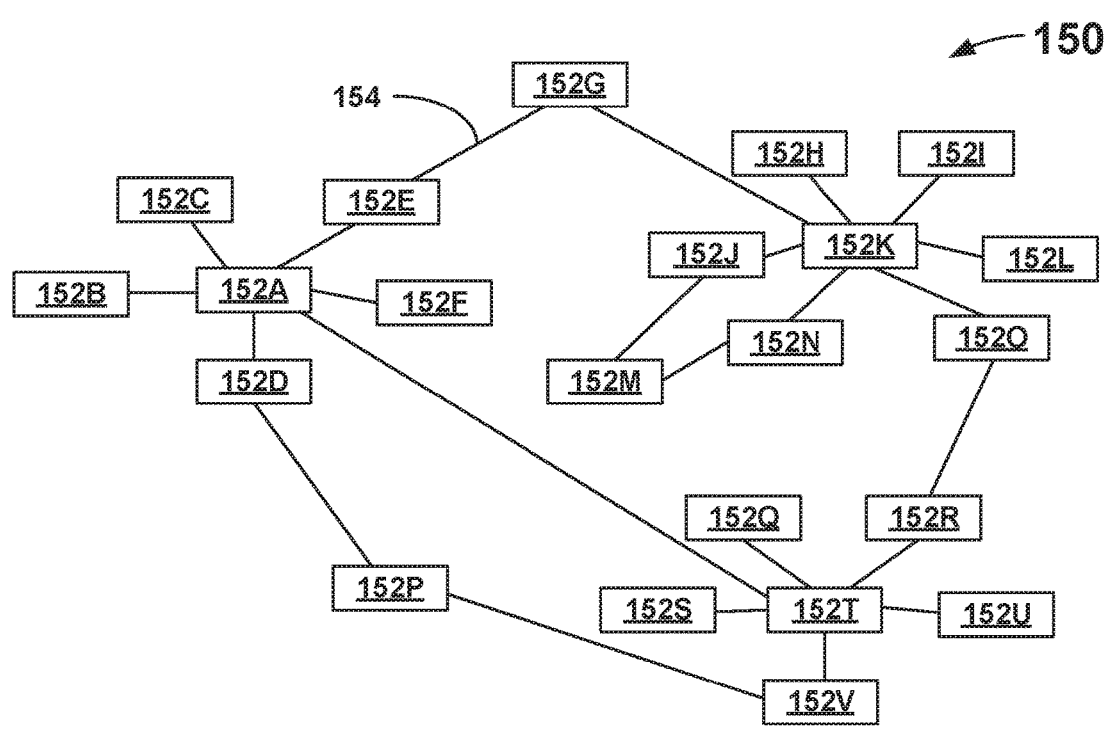
FIG. 1B depicts an example data graph data structure.

Controller 110 may provide a focus mode for data graph data structures such as data graph 150 of FIG. 1B. Data graph 150 includes a plurality of nodes 152A-152V (collectively, "nodes 152") connected by a plurality of edges 154 (which may also be referred to as "edges") that depict relationships between respective nodes. For example, node 152A may indicate a data concept of "revenue," and further each of nodes 152B-152F, 152T that are related to node 152A may be a different source or type of revenue. While in FIG. 1B all nodes 152 and edges 154 are depicted as visually identical, in other examples different nodes 152 and/or edges 154 may have different visual elements, such as different sizes or shapes or colors or line thicknesses or the like. For example, nodes 152 that indicate data tables of people may have a first visual element, and nodes 152 that indicate data tables of locations may have a second visual element, while nodes 152 that indicate data tables of concepts may have a third visual element. Further, in some examples some or all edges 154 may indicate a cardinality between nodes 152 indicating a direction in which one node 152 provides data for and/or relates to data of the related node 152.

Data graph 150 may have a predetermined spatial arrangement as depicted in FIG. 1B. This arrangement may include the amount of relative spacing between nodes 152 of data graph 150. This visual spacing may be stored by controller 110 (e.g., stored on database 130 on which controller 110 stores or otherwise accesses data of data graph 150) such that controller 110 may depict the relative spacing identically across a plurality of displays 122 of a plurality of user devices 120. In this way, controller 110 may cause the depicted relative spacing of nodes 152 and edges 154 to be consistent across displays 122 that have relatively different resolutions and/or are of different sizes.

Figure 1C:
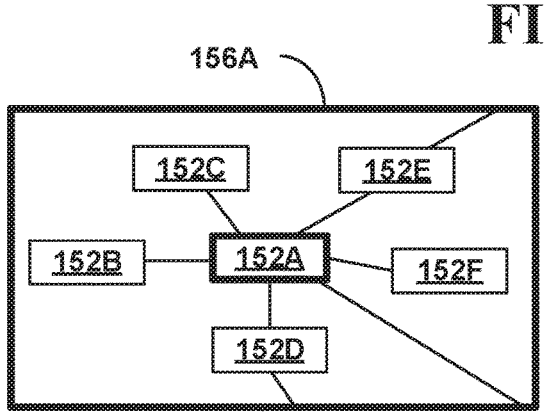
FIG. 1C depicts an example viewport of the data graph of FIG. 1B that may be presented in the display of FIG. 1A when a user is attempting to view all nodes directly related to one node.

Controller 110 may receive a request to provide a focus mode for selected node 152A from user device 120. For example, a user may have been maneuvering (e.g., scrolling in different directions and/or changing a magnification level) around data graph 150 by manipulating those nodes 152 depicted according to the predetermined spatial arrangement on data graph 150, only to cause controller 110 to generate viewport 156A of FIG. 1C. As depicted on FIG. 1C, viewport 156A may depict five nodes 152B-152F that are directly related to selected node 152A, but viewport 156 may indicate that there is an unviewed node (e.g., node 152T) that cannot be depicted at the current magnification level of data graph 150.

Figure 1D:
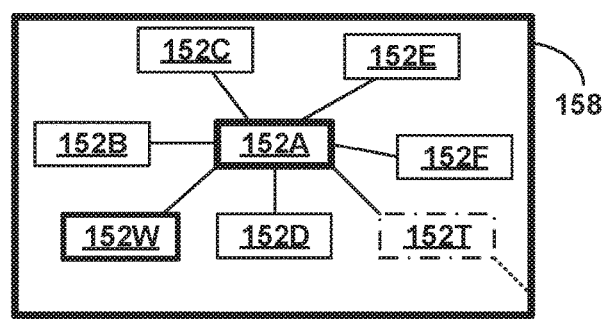
FIG. 1D depicts an example focus mode of nodes directly related to one selected node of the data graph data structure of FIG. 1B that may be generated by the controller of FIG. 1A on the display of FIG. 1A.

In response to this request, controller 110 may generate focus mode 158 of FIG. 1D. Controller 110 may provide focus mode 158 as a GUI on display 122 of user device 120. As depicted in FIG. 1D, focus mode 158 includes selected node 152A and nodes 152B-152F, 152T of data graph 150 that are related to selected node 152A, and relationships thereof. Focus mode 158 also depicts new node 152W, which is discussed in greater detail below. A boundary of selected node 152A is bolded for purposes of illustration, though in other examples controller 110 may cause focus mode 158 to depict selected node 158 substantially similar to other related nodes 152B-152F, 152T (and 152W).

Controller 110 is configured to spatially arrange related nodes 152A-152F, 152T from data graph 150 to define relatively less cumulative space between them within focus mode 158 (e.g., so that a full relationship scheme may be better understood by a user viewing focus mode 158 on display 122 of user device 120). In some examples, controller 110 may determine the updated spatial arrangement of focus mode 158 by generally centering all nodes 152A-152F, 152T of focus mode 158 around a center point (e.g., a center point from viewport 156A), and then updating all edges 154 to indicate respective relationships. In some examples, controller 110 may cause display 122 to generate focus mode 158 by "sliding" some or all relevant nodes 152 to their new respective positions in the updated spatial arrangement. For example controller 110 may cause node 152T to slide from a bottom right corner of viewport 156A into its depicted location in focus mode 158.

In response to a stop request relating to focus mode 158 (e.g., a request for controller 110 to provide full data graph 150 again), controller 110 may revert a presentation of nodes 152 of data graph 150 to the predetermined spatial arrangement of FIG. 1B. In this way, controller 110 may be configured to identify (and therein provide within a GUI) a form of nodes 152 of data graph that includes selected node 152 and related nodes 152A-152F, 152T in a compressed fashion (relative to data graph 150). Further, controller 110 may be configured to identify (and therein provide within a GUI on display 122) the predetermined spatial arrangement of data graph 150 as a transition from focus mode 15158 6.

In some examples, controller 110 may provide focus mode 158 such that focus mode 158 indicates some information about the full data graph 150 that is not depicted within focus mode 158. For example, controller 110 may identify central hub nodes 152A, 152K, 152T of data graph 150, where central hub nodes are nodes 152 that are related to at least a threshold number of nodes 152 (e.g., at least three nodes 152). Controller 110 may provide an identifying visual element to one of these central hub nodes 152 that is within focus mode 158 that satisfies this threshold.

In some examples, controller 110 may only provide this identifying visual element to a central hub node within focus mode if it is not evident within focus mode 158 that this node is a central hub node. For example, it may be unnecessary to provide an identifying visual element to central hub node 152A, as focus mode 158 depicts that central hub node 152A is related to nodes 152B-152F, 152T (such that a user can identify node 152A as a central hub node by looking at focus mode 158). However, controller 110 may determine that central hub node 152T is only related to one node 152 within focus mode 158, such that a user may be unable to identify using focus mode 158 alone that node 152T is a central hub node. As such, as depicted in FIG. 1D, controller 110 may provide a unique visual element to this central hub node 152T that is not displayed relative to other related nodes 152B-152F, such as the dashed and dotted edge of node 152T.

Further, controller 110 may be configured to provide a dashed edge extending toward an edge of focus mode 158 as leading to these undepicted related nodes 152Q-152S, 152U, 152V. In focus mode 158 of FIG. 1D, controller 110 does not cause display 122 to generate indications (such as similar dashed edges) to other nodes 152G, 152P that are related to nodes 152E, 152D of focus mode 158, though in other examples (e.g., such as in FIGS. 2-4C) controller 110 may additionally or alternatively cause display 122 to generate such visual indications. Controller 110 may determine whether to provide these indications according to system preferences or user preferences, and controller 110 may learn different preferences of users or organizations over time using machine learning techniques as described herein.

In some examples, controller 110 may enable a user to provide a permanent modification to data graph 150 while controller 110 is providing focus mode 158. For example, controller 110 may receive a request to add new node 152W. Controller 110 may enable a user using user device 120 to provide any relevant metadata of new node 152W (e.g., a category or table of data of new node 152W or the like). Additionally, or alternatively, controller 110 may enable a user to spatially arrange new node 152W, and/or to modify a relative spatial arrangement of the nodes 152A-152F, 152T of focus mode 158 relative to new node 152W. Following this, in response to a request from a user to stop providing focus mode 158, controller 110 may integrate the permanent modification into data graph 150. For example, controller 110 may integrate new node 152W and/or relative spacing of other nodes 152 as modified in focus mode 158 into the predetermined spatial arrangement of data graph 150. Controller 110 may determine the integration which requires the least relative adjustment of spacing from the predetermined spatial arrangement to the updated spatial arrangement of focus mode 158.

In some examples, controller 110 may receive a request for a focus mode that depicts nodes that are related beyond a direct relation (e.g., where a direct relation is a relation that directly connects two nodes 152 such that a respective edge 154 directly connects them). For example, for selected node 152A, controller 110 may receive a request for directly related nodes 152 (e.g., nodes 152 that are connected to the selected node 152A), as well as secondary related nodes 152 (e.g., nodes 152 that are connected to the directly related nodes 152), and/or tertiary related nodes 152 (e.g., nodes 152 that are connected to the secondary related nodes 152), and the like.

For example, a user may have been maneuvering around a graphical representation of data graph 150 as depicted on display 122. Specifically, the user may manipulate those nodes 152 depicted according to the predetermined spatial arrangement on data graph 150 to cause controller 110 to generate viewport 156B of FIG. 2A. As depicted on FIG. 2A, viewport 156B depicts a majority of nodes 152 of data graph 152, but does not clearly indicate which nodes 152 of data graph are either directly or secondarily related to selected node 152A. Further, even though a majority of nodes 152 are depicted in viewport 156B, some nodes that are both directly and secondarily related to selected node 152A.

In response to this, a user may submit a focus mode request for directly and secondarily related nodes 152 for selected node 152A. For example, FIG. 2B depicts focus mode 160 of directly related nodes 152B-152F, 152T as well as secondary related nodes 152G, 152P-152V that are related to directly related nodes 152B-152F, 152T.

Focus mode 160 depicts these nodes 152 in an updated spatial arrangement that defines relatively less space between these nodes 152 that in the predetermined spatial arrangement of full data graph 150. Similar to focus mode 158, controller 110 may generate focus mode 160 by sliding nodes 152 from their spatial position in FIG. 2A to their spatial position in FIG. 2B, including sliding respective nodes 152 from outside of viewport 156B to within the depicted focus mode 160 as relevant.

Figure 2A:
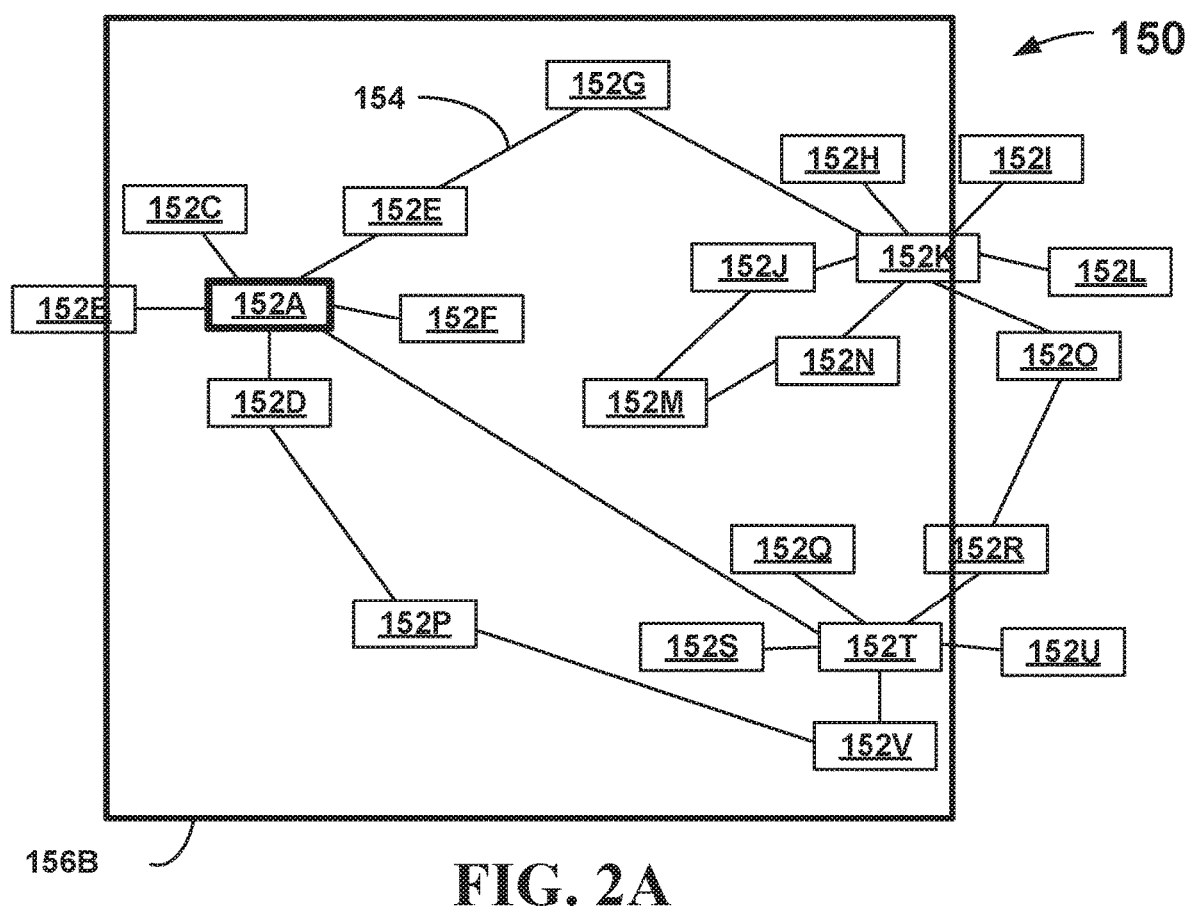
FIG. 2A depicts an example viewport of the data graph of FIG. 1B that may be presented in the display of FIG. 1A when a view attempts to attempts to maneuver on the data graph to view nodes that are directly and secondary related to one selected node.
Figure 2B:
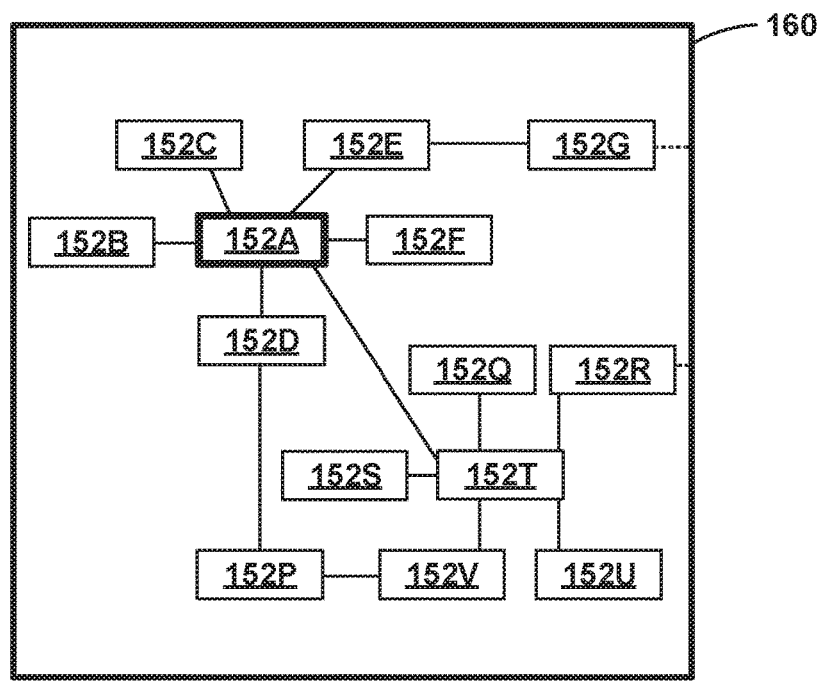
FIG. 2B depicts an example focus mode of nodes directly and secondarily related to one selected node of the data graph data structure of FIG. 1B that may be generated by the controller of FIG. 1A on the display of FIG. 1A.

In some examples, as depicted in FIG. 2B, controller 110 may be configured to maintain general clusters around identified central hub nodes 152A, 152T (even if the spatial arrangement of these clusters has been altered), though in other examples controller 110 may condense nodes 152 to a point where these general clusters are less identifiable. Controller 110 may determine whether to maintain spatial arrangements of the predetermined spatial arrangement of data graph 150 and/or minimize an amount of space between nodes 152 based on learned user preferences or organization preferences.

As depicted in FIG. 2B, controller 110 includes within focus mode 160 dashed edges extending from nodes 152G, 152R to indicate relationships between these nodes 152G, 152R and other nodes 152K, 152O that are not in focus mode 160 (e.g., as these nodes 152K, 152O are not directly related nodes 152 or secondary related nodes 152 as described herein). As discussed above, in response to a detected request to stop causing display 122 to provide focus mode 160, controller 110 may cause display 122 to display data graph 150 according to the predetermined spatial arrangement of FIG. 1B.

Figure 3A:
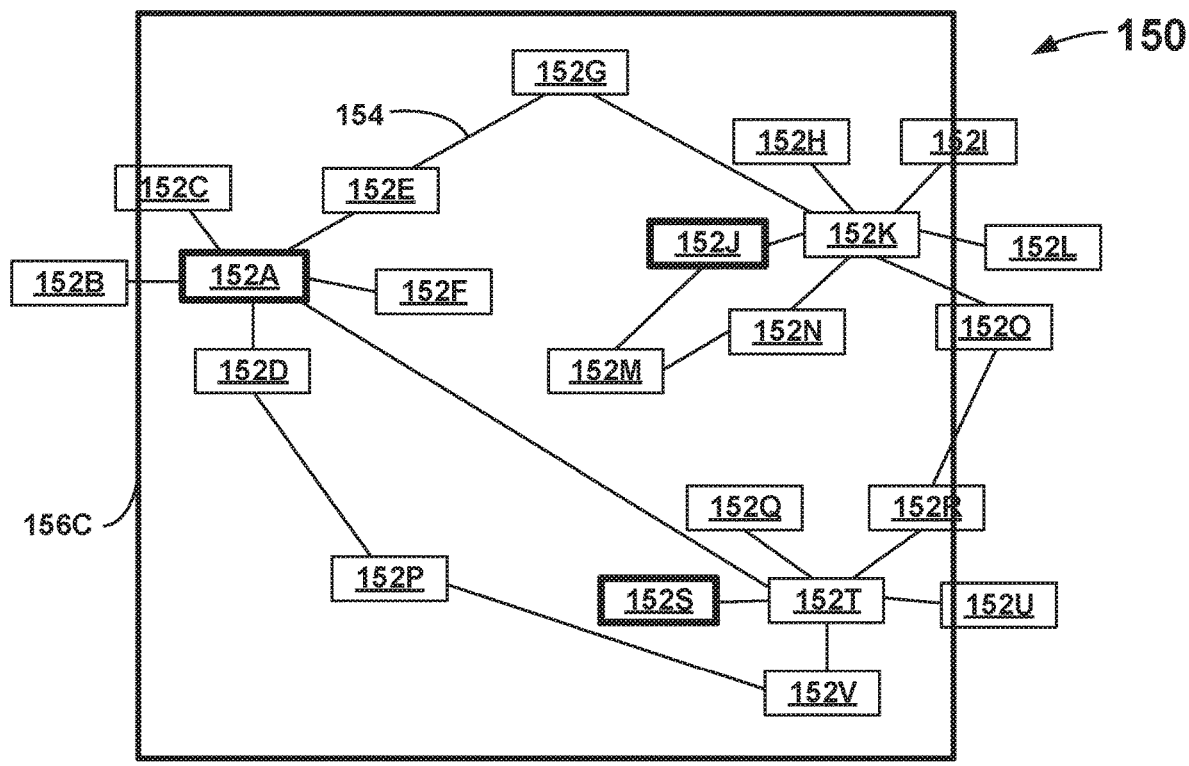
FIG. 3A depicts an example viewport of the data graph of FIG. 1B that may be presented in the display of FIG. 1A when a user attempts to maneuver on the data graph to view nodes that are directly related to three selected nodes.

In certain examples, controller 110 may receive a request for a focus mode that depicts nodes 152 that are related to a plurality of nodes 152. For example, as depicted in FIG. 3A, a user may have been maneuvering viewport 156C around a graphical representation of data graph 150 as depicted on display 122 to attempt to view nodes 152 related to the three selected nodes 152A, 152J, 152S. As depicted on FIG. 3A, viewport 156C depicts nearly all nodes 152 of data graph 152, but does not clearly indicate which nodes 152 of data graph are directly related to one of these three selected nodes 152A, 152J, 152S, partially by showing a number of nodes 152 that are not related to one of these three selected nodes 152A, 152J, 152S.

Figure 3B:
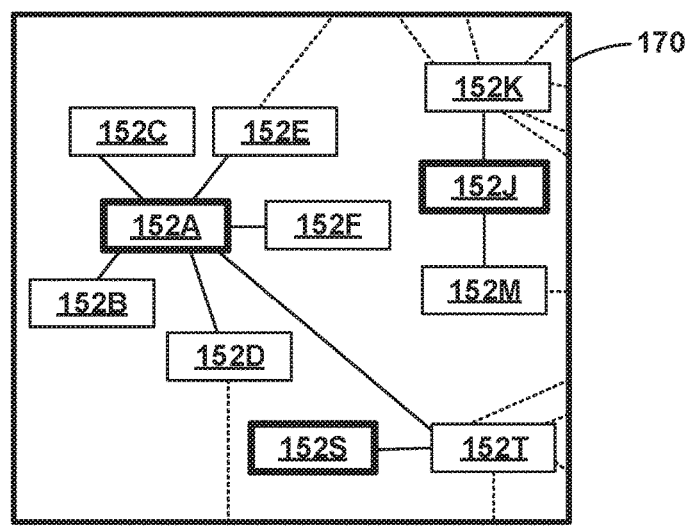
FIG. 3B depicts an example focus mode of nodes directly related to three selected nodes of the data graph data structure of FIG. 1B that may be generated by the controller of FIG. 1A on the display of FIG. 1A.

As a result of this, a user may submit a focus mode request for nodes 152 directly and related to the three selected nodes 152A, 152J, 152S. For example, FIG. 3B depicts focus mode 170 of directly related nodes 152B-152F, 152T, 152M, 152K for the three selected nodes 152A, 152J, 152S.

Similar to what was described above, focus mode 170 depicts these nodes 152 in an updated spatial arrangement that defines relatively less space between these nodes 152 that in predetermined spatial arrangement of full data graph 150 of FIG. 1B. Further, similar to what was described above, controller 110 includes within focus mode 170 dashed edges extending away from certain nodes 152D, 152E, 152K, 152M, 152T to indicate relationships between these nodes 152D, 152E, 152K, 152M, 152T within focus mode 170 and other nodes 152 that are not in focus mode 170. Similar to focus modes 158, 160, controller 110 may generate focus mode 170 by sliding nodes 152 from their spatial position in FIG. 3A to their spatial position in FIG. 3B, including sliding respective nodes 152 from outside of viewport 156C to within the depicted focus mode 170 as relevant.

In some examples, as depicted in FIG. 3, controller 110 may cause display 122 to provide these indications along a general direction in which these non-depicted nodes 152 are located on predetermined spatial arrangement related to respective nodes 152 of focus mode 170. By causing these indicating edges to indicate such a general direction, controller 110 may improve a symmetry between the updated spatial arrangement of focus mode 170 and the predetermined spatial arrangement of the full data graph 150 (therein potentially improving an ability of a user to understand both focus mode 170 and the full data graph 150). As discussed above, in response to a detected request to stop causing display 122 to provide focus mode 170, controller 110 may cause display 122 to display data graph 150 according to the predetermined spatial arrangement of FIG. 1B.

Controller 110 may receive a request to temporarily modify the spatial arrangement of nodes 152 and relationships 154 within focus mode 170. For example, controller 110 may receive a request to move node 152J further from node 152F. For another example, controller 110 may receive a request to move node 152T closer to node 152A (e.g., moving node 152T along the connection between node 152T and node 152A). Controller 110 may distinguish such a request for a temporary modification from a request for a permanent modification by identifying a different nature of the received request (e.g., the request for a temporary modification being sent via a right click of a computing mouse rather than a left click for a permanent modification). In response to a detected request to stop causing display 122 to provide focus mode 170, controller 110 may cause display 122 to display data graph 150 according to the predetermined spatial arrangement of FIG. 1B without this temporary modification.

Figure 4A:
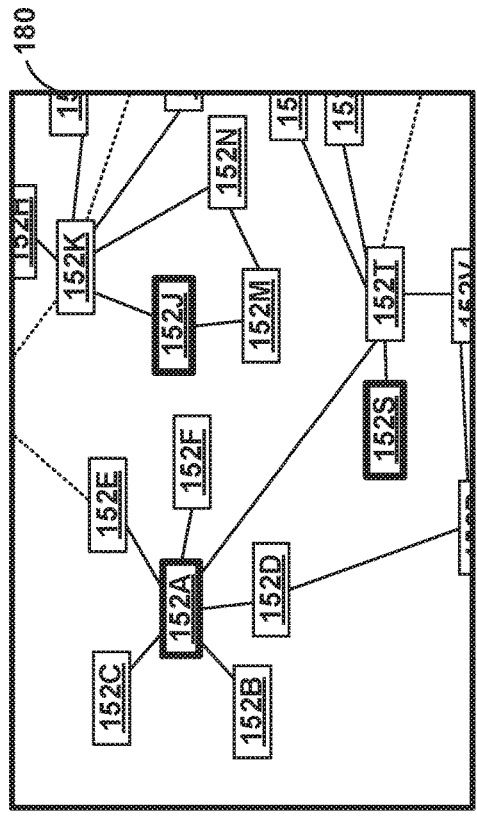
FIGS. 4A-4D depict a transition between the focus mode of FIG. 3 and the full data graph data structure of FIG. 1B.
Figure 4B:
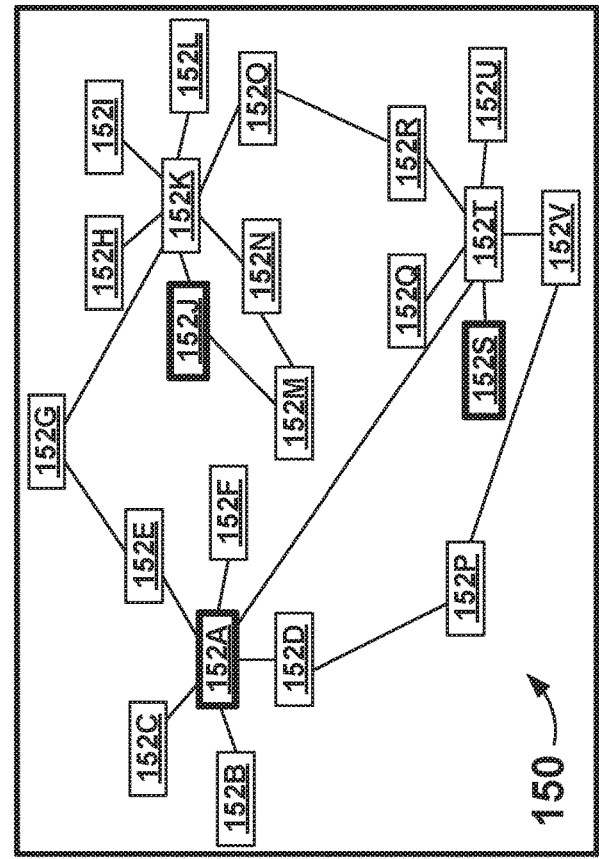
Figure 4C:
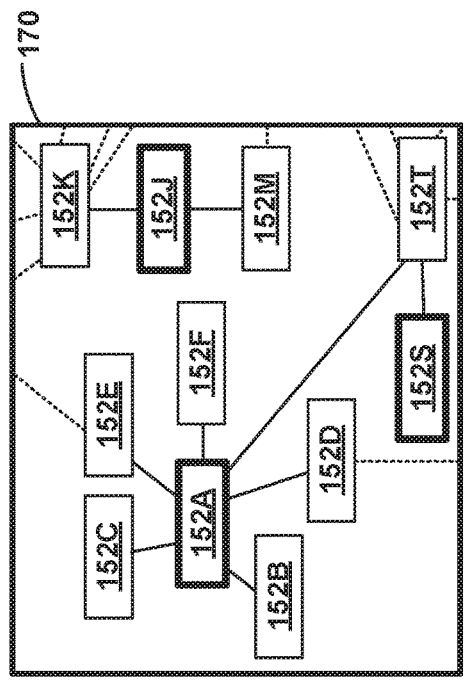
Figure 4D:
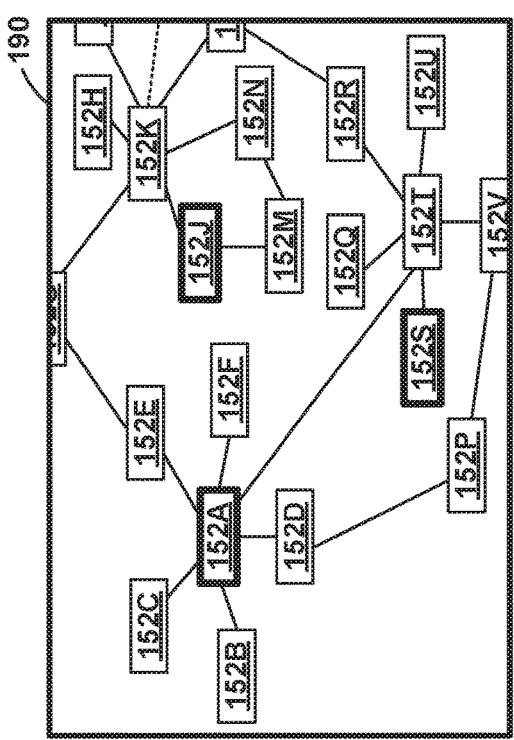

Controller 110 may be configured to provide a graphically animated transition between an updated spatial arrangement of a focus mode 158, 160, 170 and the predetermined spatial arrangement of data graph 150. For example, FIGS. 4A-4D depict stages of a graphically animated transition between focus mode 170 and the predetermined spatial arrangement of data graph 150. FIG. 4A depicts focus mode 170, while FIG. 4D depicts the predetermined spatial arrangement of data graph 150 within viewport 156D (e.g., such that a viewer has fully minimized data graph 150 on display 122), and FIGS. 4B and 4C depict intermediate stages 180, 190.

This transition from focus mode 170 to intermediate stages 180, 190 to predetermined spatial arrangement of data graph 150 may include a graphical transition of each element from a first location of the depicted focus mode 170 arrangement to the predetermined location of each element in the predetermined spatial arrangement. As depicted in FIGS. 4B and 4C, during the transition controller 110 may bring additional nodes 152 into a depicted GUI as part of the transition to "zoom out" to fit in the entire data graph 150. Further, during the transition controller 110 may change dashed edge indications into solid edges 154 as both nodes 152 of a relationship come into the GUI. Further, the spatial arrangement of many or all nodes 152 may move as part of this transition. Where a user provided a permanent modification, controller 110 may include the integration of this permanent modification within the transition.

In some examples, controller 110 may depict this graphically animated transition according to prompts from a user. For example, controller 110 may control a rate of the transition (e.g., how quickly display 122 changes from focus mode 170 to intermediate stage 180 to intermediate stage 190 to predetermined spatial arrangement) according to user prompts, where a user can request that controller 110 provide the animated transition relatively faster or slower. For another example, controller 110 may depict a direction of the transition (e.g., whether "toward" the data graph 150 by transitioning from focus mode 170 to intermediate stage 180 to intermediate stage 190, or transitioning "toward" focus mode 170 by transitioning from intermediate stage 190 to intermediate stage 180 to focus mode 170) according to prompts from a user. Controller 110 may enable a user to transition between focus modes, intermediate stages, and the final predetermined spatial arrangement substantially any number of times, so that a user may slowly or quickly transition between these states as desired. For example, a user may provide prompts using a scroll wheel of a mouse, such that scroll the wheel in a different direction at a different speed to provide the rate and/or directionality of the transition prompts.

As described above, controller 110 may include computing device 200 with a processor configured to execute instructions stored on a memory to execute the techniques described herein. For example, FIG. 5 is a conceptual box diagram of such computing device 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with user devices 120, database 130, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to manage a focus mode for data graphs. Controller 110 may utilize processor 220 to provide this focus mode. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to manage a focus mode for a data graph data structure.

Processor 220 may manage a focus mode for data graphs according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may manage focus modes as described herein according to instructions 240 of one or more applications (e.g., software applications) stored in memory 230 of controller 110.

In addition to instructions 240, in some examples gathered or predetermined data or techniques or the like as used by processor 220 to manage focus mode for data graphs may be stored within memory 230. For example, memory 230 may include information described above that may be stored in database 130, and/or may memory 230 may include substantially all of database 130. For example, as depicted in FIG. 5, memory 230 may include data graph data 232, which includes spatial data 234. Data graph data 232 may include data on nodes and/or relationships between nodes. In examples where some nodes and/or relationships are depicted with different visual elements to represent different characteristics of these nodes and/or relationships (e.g., such as a cardinality of edges 154), these visual elements may also be stored in data graph data 232. Further, spatial data 234 may include relative distances between nodes and/or relative orientations of nodes and relationships of a respective data graph.

Memory 230 may also include preference data 236. Preference data 236 may include one or more preferences of one or more users. For example, preference data 236 may include data on whether or not a user wants to have visual indications of relationships between depicted nodes and nodes outside of the focus mode GUI. For another example, preference data 236 may include preferences as to whether or not a user prefers that a node retain a visual indication that the node is a central hub node of the full data graph, even if the node only has a single relationship within a focus mode. In some examples, preference data 236 may include a preference for one or more users as to an acceptable amount of node and/or edge overlap that is accepted when in focus mode. For example, some users may want the updated spatial arrangement of focus mode to be as condensed as possible (such that there is relatively more overlap of edges and/or nodes), whereas another user may want substantially zero overlap, and/or at least a threshold amount of space between each node.

Memory 230 may further include machine learning techniques 238 that controller 110 may use to improve a process of managing a focus mode as discussed herein over time. Machine learning techniques 238 can comprise algorithms or models that are generated by performing supervised, unsupervised, or semi-supervised training on a dataset, and subsequently applying the generated algorithm or model to provide a focus mode for data graphs according to preference and threshold data 236.

Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Figure 6:
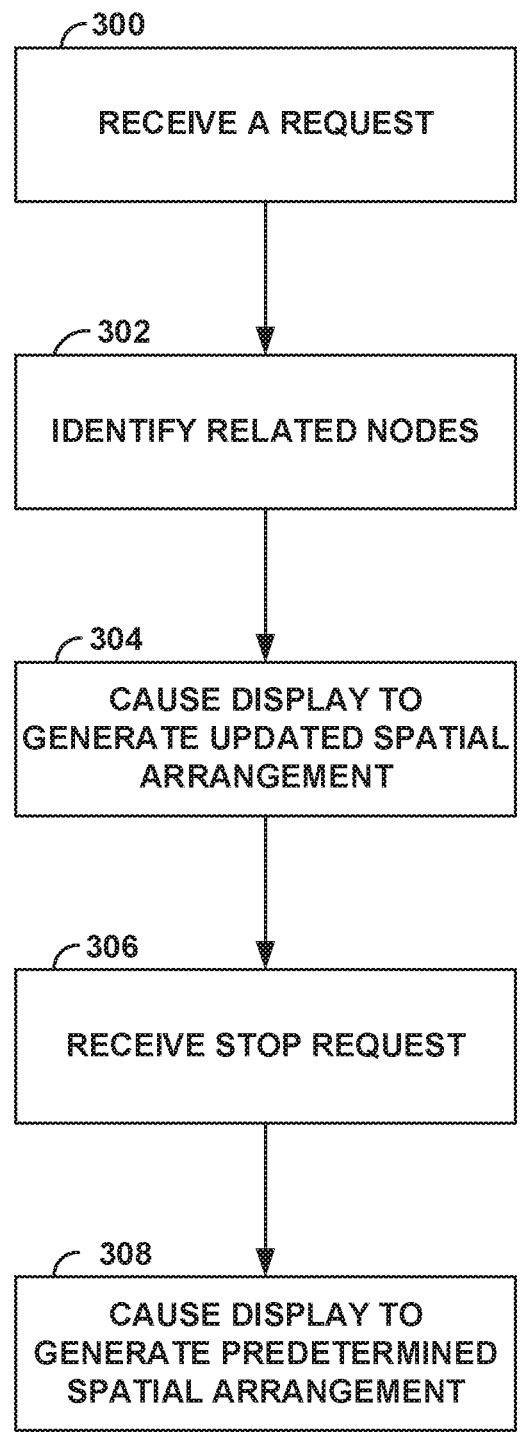
FIG. 6 depicts an example flowchart of providing a focus mode consistent with embodiments of this disclosure.

Using these components, controller 110 may manage a focus mode for data graphs as discussed herein. For example, controller 110 may manage focus mode according to the flowchart depicted in FIG. 6. The flowchart of FIG. 6 is discussed with relation to FIGS. 1A-1C for purposes of illustration, though it is to be understood that other systems and data graphs may be used to execute the flowchart of FIG. 6 in other examples. Further, in some examples controller 110 may execute a different method than the flowchart of FIG. 6, or controller 110 may execute a similar method with more or less steps in a different order, or the like.

As depicted in FIG. 6, controller 110 receives a request to enter a focus mode (300). Controller 110 may receive the request for data graph 150 data structure that includes a plurality of relationship edges 154 between a plurality of nodes 152 arranged in a predetermined spatial arrangement. As discussed herein, the focus mode request may relate to temporarily identifying all nodes that are related to a selected node 152, and/or a collection of selected nodes 152. For example, the focus mode request may relate to selected node 152A.

In response to receiving this request, controller 110 identifies nodes 152B-152F, 152T that are related to selected node 152A (302). Controller 110 may identify these related nodes 152B-152F, 152T as nodes 152 that are connected via respective relationship edges 154 originating from the selected node 152A. Alternatively, controller 110 may reference a separate database that references these relationships as stored within database 130.

Once identified, controller 110 causes display 122 to generate the focus mode (304). As discussed herein, the focus mode may include an updated spatial arrangement which defines a different relative spacing between selected node 152A and related nodes 152B-152F, 152T than the predetermined spatial arrangement. For example, the updated spatial arrangement may define relatively less cumulative space between selected node 152A and related nodes 152B-152F, 152T. Controller 110 may determine this updated spatial arrangement by first removing unrelated nodes 152 from a GUI of display 122 and then condensing nodes 152A-152F, 152T around a center point of the GUI until a spacing preference is satisfied (e.g., a preference of preference data 236).

Controller 110 may receive a request to stop the focus mode (306). For example, a user may send a request from user device 120 by exiting out of the focus mode GUI. In response to this request, controller 110 may cause display 122 to generate the original predetermined spatial arrangement of data graph 150 (308). In some examples, controller 110 may provide a graphically animated transition between the updated spatial arrangement and the predetermined spatial arrangement on display 122. For example, controller 110 may enable a user to control this transition on user device 120 by, e.g., transitioning according to user operation of a scroll wheel of a mouse of user device 120. Controller 110 may enable a user to transition back and forth between the predetermined spatial arrangement and the updated spatial arrangement a pseudo-infinite number of times.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
    receiving a request, for a data graph data structure that includes a plurality of relationships between a plurality of nodes arranged in a predetermined spatial arrangement, to temporarily identify all nodes that are related to one or more selected nodes of the plurality of nodes;
    identifying one or more related nodes that are related to the one or more selected nodes;
    causing a display to generate only the one or more selected nodes and each of the one or more related nodes and the relationships thereof in an updated spatial arrangement that defines relatively less cumulative space between the one or more selected nodes and the one or more related nodes than the predetermined spatial arrangement;

receiving a request to add a new node as a permanent modification to the data graph structure, wherein the request defines a spatial arrangement between the new node and the selected nodes in the updated spatial arrangement and the new node is related to at least one of the one or more selected nodes;

receiving a request to stop generating the updated spatial arrangement; and causing the display to generate the predetermined spatial arrangement in response to receiving the request to stop generating the updated spatial arrangement such that the new node is integrated into the predetermined spatial arrangement.

2. The computer-implemented method of claim 1, further comprising:

receiving another permanent modification to the updated spatial arrangement;

causing the display to generate the updated spatial arrangement with the another permanent modification;

integrating the another permanent modification into the predetermined spatial arrangement; and causing the display to generate the predetermined spatial arrangement with the integrated another permanent modification in response to receiving the request to stop generating the updated spatial arrangement.

3. The computer-implemented method of claim 1, wherein integrating the new node into the predetermined spatial arrangement includes integrating the new node at the spatial arrangement into the predetermined spatial arrangement.

4. The computer-implemented method of claim 1, wherein the updated spatial arrangement includes one or more indications of one or more relationships that the one or more related nodes have with other nodes of the plurality of nodes that are not related to the one or more selected nodes.

5. The computer-implemented method of claim 1, further comprising:

receiving a second request, for the data graph data structure, to temporarily identify all nodes that are related to the one or more selected nodes and the one or more related nodes;

identifying one or more secondary related nodes that are related to the one or more related nodes;

causing the display to generate only the one or more selected nodes and each of the one or more related nodes and the one or more secondary related nodes and the relationships thereof in an expanded updated spatial arrangement that defines relatively less cumulative space between the one or more selected nodes and the one or more related nodes and the one or more secondary related nodes than the predetermined spatial arrangement;

receiving a request to stop generating the expanded updated spatial arrangement; and causing the display to generate the predetermined spatial arrangement.

6. The computer-implemented method of claim 1, further comprising:

receiving a temporary modification to the updated spatial arrangement; and causing the display to generate the updated spatial arrangement with the temporary modification, wherein the causing the display to generate the predetermined spatial arrangement includes disregarding the temporary modification.

7. The computer-implemented method of claim 1, wherein the causing the display to generate the predetermined spatial arrangement includes causing the display to generate a transition between the updated spatial arrangement and the predetermined spatial arrangement.

8. The computer-implemented method of claim 7, wherein a rate and direction of the transition is executed according to prompts from a user.

9. The computer-implemented method of claim 8, wherein prompts from the user includes prompts to maneuver within a viewport of the display.

10. The computer-implemented method of claim 1, wherein the updated spatial arrangement includes the one or more selected nodes and the one or more related nodes spatially centered around a center point of a graphical user interface of the display that is depicting the updated spatial arrangement.

11. A system comprising:

a display;

a processor; and a memory in communication with the processor, the memory containing instructions that, when executed by the processor, cause the processor to:

receive a request, for a data graph data structure that includes a plurality of relationships between a plurality of nodes arranged in a predetermined spatial arrangement, to temporarily identify all nodes that are related to one or more selected nodes of the plurality of nodes;

identify one or more related nodes that are related to one or more selected nodes;

cause the display to generate only the one or more selected nodes and each of the one or more related nodes and the relationships thereof in an updated spatial arrangement that defines relatively less cumulative space between the one or more selected nodes and the one or more related nodes than the predetermined spatial arrangement;

receive a request to add a new node as a permanent modification to the data graph structure, wherein the request defines a spatial arrangement between the new node and the selected nodes in the updated spatial arrangement and the new node is related to at least one of the one or more selected nodes;

receive a request to stop generating the updated spatial arrangement; and cause the display to generate the predetermined spatial arrangement in response to receiving the request to stop generating the updated spatial arrangement such that the new node is integrated into the predetermined spatial arrangement.

12. The system of claim 11, wherein the updated spatial arrangements included one or more indications of one or more relationships that the one or more related nodes have with other nodes of the plurality of nodes that are not related to the one or more selected nodes.

13. The system of claim 11, the memory further containing instructions that, when executed by the processor, cause the processor to:

receive a second request, for the relationship diagram data structure, to temporarily identify all nodes that are related to the one or more selected nodes and the one or more related nodes;

identify one or more secondary related nodes that are related to the one or more related nodes;

cause the display to generate only the one or more selected nodes and each of the one or more related nodes and the one or more secondary related nodes and the relationships thereof in an expanded updated spatial arrangement that defines relatively less cumulative space between the one or more selected nodes and the one or more related nodes and the one or more secondary related nodes than the predetermined spatial arrangement;

receive a request to stop generating the expanded updated spatial arrangement; and cause the display to generate the predetermined spatial arrangement.

14. The system of claim 11, the memory further containing instructions that, when executed by the processor, cause the processor to:

receive another permanent modification to the updated spatial arrangement;

cause the display to generate the updated spatial arrangement with the another permanent modification;

integrate the permanent modification into the predetermined spatial arrangement; and cause the display to generate the predetermined spatial arrangement with the integrated another permanent modification in response to receiving the request to stop generating the updated spatial arrangement.

15. The system of claim 11, wherein integrating the new node into the predetermined spatial arrangement includes integrating the new node at the spatial arrangement into the predetermined spatial arrangement.

16. The system of claim 11, the memory further containing instructions that, when executed by the processor, cause the processor to:

receive a temporary modification to the updated spatial arrangement; and cause the display to generate the updated spatial arrangement with the temporary modification, wherein the causing the display to generate the predetermined spatial arrangement includes disregarding the temporary modification.

17. The system of claim 11, wherein causing the display to generate the predetermined spatial arrangement includes causing the display to generate a transition between the updated spatial arrangement and the predetermined spatial arrangement and wherein a rate and direction of the transition is executed according to prompts from a user.

18. A computer program product, the computer program product comprising a computer readable storage medium having program instructions embodied therewith, the program instructions executable by a computer to cause the computer to:

receive a request, for a data graph data structure that includes a plurality of relationships between a plurality of nodes arranged in a predetermined spatial arrangement, to temporarily identify all nodes that are related to one or more selected nodes of the plurality of nodes;

identify one or more related nodes that are related to the one or more selected nodes;

cause a display to generate only the one or more selected nodes and each of the one or more related nodes and the relationships thereof in an updated spatial arrangement that defines relatively less cumulative space between the one or more selected nodes and the one or more related nodes than the predetermined spatial arrangement;

receive a request to add a new node as a permanent modification to the data graph structure, wherein the request defines a spatial arrangement between the new node and the selected nodes in the updated spatial arrangement and the new node is related to at least one of the one or more selected nodes;

receive a request to stop generating the updated spatial arrangement; and cause the display to generate the predetermined spatial arrangement in response to receiving the request to stop generating the updated spatial arrangement such that the new node is integrated into the predetermined spatial arrangement.

\* \* \* \* \*